(12) United States Patent
Gorczowski et al.

(10) Patent No.: US 8,234,219 B2
(45) Date of Patent: Jul. 31, 2012

(54) METHOD, SYSTEM AND APPARATUS FOR SECURE DATA EDITING

(75) Inventors: Robert E. Gorczowski, Frankfort, IL (US); Brian D. Schubbe, Peotone, IL (US); Paul T. Klawitter, Frankfort, IL (US)

(73) Assignee: Applied Systems, Inc., University Park, IL (US)

( * ) Notice: Subject to any disclaimer, the term of this patent is extended or adjusted under 35 U.S.C. 154(b) by 995 days.

(21) Appl. No.: 12/207,454

(22) Filed: Sep. 9, 2008

(65) Prior Publication Data

US 2010/0064375 A1 Mar. 11, 2010

(51) Int. Cl.
G06Q 20/00 (2012.01)

(52) U.S. Cl. ........... 705/64; 726/26; 715/743; 340/5.54; 340/5.85

(58) Field of Classification Search ........................ None
See application file for complete search history.

(56) References Cited

U.S. PATENT DOCUMENTS

| | | | |
|---|---|---|---|
| 5,550,968 A * | 8/1996 | Miller et al. ................. | 715/741 |
| 6,195,662 B1 | 2/2001 | Ellis | |
| 6,571,285 B1 | 5/2003 | Groath | |
| 7,010,503 B1 | 3/2006 | Oliver | |
| 7,013,284 B2 | 3/2006 | Guyan | |
| 7,076,733 B2 | 7/2006 | Smith | |
| 7,216,292 B1 | 5/2007 | Snapper | |
| 7,225,461 B2 | 5/2007 | Oshima | |
| 7,257,647 B2 | 8/2007 | Katz | |
| 7,293,231 B1 | 11/2007 | Gunn | |
| 7,362,973 B1 | 4/2008 | Dickson | |
| 7,698,555 B2 * | 4/2010 | Jiang et al. ................... | 713/168 |
| 7,788,498 B2 * | 8/2010 | Yang et al. ................... | 713/183 |
| 8,026,930 B2 * | 9/2011 | Childress et al. ............. | 345/629 |
| 2001/0049611 A1 | 12/2001 | Peach | |
| 2002/0113810 A1 | 8/2002 | Radtke | |
| 2003/0061482 A1 | 3/2003 | Emmerichs | |
| 2004/0201607 A1 | 10/2004 | Mulvey | |
| 2006/0085759 A1 * | 4/2006 | Knapheide ................... | 715/777 |
| 2006/0129948 A1 * | 6/2006 | Hamzy et al. ................ | 715/790 |
| 2006/0262102 A1 | 11/2006 | Lee | |
| 2006/0290680 A1 * | 12/2006 | Tanaka et al. ................ | 345/173 |

(Continued)

FOREIGN PATENT DOCUMENTS

GB 2425700 1/2006

(Continued)

OTHER PUBLICATIONS

International Search Report mailed Oct. 21, 2009 and International Preliminary Report on Patentability mailed Mar. 24, 2011 for International Application No. PCT/US2009/056377.

(Continued)

*Primary Examiner* — Jamie Kucab

(74) *Attorney, Agent, or Firm* — K&L Gates LLP

(57) ABSTRACT

A system, method, and apparatus for secure data editing is disclosed. A data field receives focus to accept a data entry from a user. The user inputs a data entry into the data field via a user interface. A determination is made of whether a manual lock event, a change focus event, or a time out event has triggered based on the user's action or inaction with the user interface. Upon the triggering of a manual lock event, a change focus event, or a time out event, the data entry in the data field is obscured. The user interface may display a data entry with a validation character which provides a reference point within the data entry while the data entry is displayed and while the data entry is obscured. The system may allow a user to have a specified function set based on his user access level.

45 Claims, 5 Drawing Sheets

U.S. PATENT DOCUMENTS

| | | | |
|---|---|---|---|
| 2007/0033647 A1* | 2/2007 | Yang et al. | 726/18 |
| 2007/0067625 A1* | 3/2007 | Jiang et al. | 713/168 |
| 2007/0124601 A1 | 5/2007 | Singh | |

FOREIGN PATENT DOCUMENTS

| | | |
|---|---|---|
| WO | 9410678 | 4/1994 |
| WO | 0214996 | 2/2002 |
| WO | 2005122401 | 12/2005 |
| WO | 2007068082 | 6/2007 |
| WO | 2007147081 | 12/2007 |

OTHER PUBLICATIONS

Manually Connect to a Wireless Network.
TextBox.VirtualMode Property, Microsoft .NET Framework Class Library.
TextBox.UseSystemPasswordChar Property, Microsoft .NET Framework Class Library.
Aspose Products Webpage.
AMS Services Webpage.

* cited by examiner

FIG. 4a

Name: Johnny Q. Public [Lock]
Address: [Lock]
Client: [Lock]

Name: ************** [Unlock]
Address: 123 Main Street [Lock] — 402
Client: [Lock]

Name: ************** [Unlock]
Address: ************** [Unlock] — 404
Client: XYZ Inc. [Lock]
ABC Corp.
Acme Co.
XYZ Inc.
Industry Co.
Big Corp.
Hi Tech Inc.

Name: ************** [Unlock]
Address: 123 Main Street [Lock] — 402
Client: ******** [Unlock]

- Name — 500, 502
  - ●●●●●●●●
- Telephone — 504
  - (●●●)●●●-●●●●
- Identification Number — 506
  - ●●/●●●●●●
- Credit Card Number — 508
  - 1234-5555-5555-1005
- Social Security Number — 510
  - - -
- Repeat Customer ☐ — 512
- Comments — 514

FIG. 5b

- Name — 550, 552
  - XXXXXXXXX
- Telephone — 554
  - (●●●)●●●-●●●●
- Identification Number — 556
  - xx/●●●●●x
- Credit Card Number — 558
  - ●●●●-●●●●-●●●●-1005
- Social Security Number — 560
  - ●●●-●●-●●●●
- Repeat Customer [x] — 562
- Comments — 564
  - XXXXXXXXXXXXXXXXXXXXXXXXXX
  - XXXXXXXXXXXXXXXXX●●●●●

METHOD, SYSTEM AND APPARATUS FOR SECURE DATA EDITING

CROSS-REFERENCE TO RELATED APPLICATIONS

This application is related to the following co-pending commonly-owned patent applications: U.S. application Ser. No. 12/207,448 filed Sep. 9, 2008, entitled "METHOD AND APPARATUS FOR REMOTELY DISPLAYING SCREEN FILES AND EFFICIENTLY HANDLING REMOTE OPERATOR INPUT," currently pending; U.S. application Ser. No. 12/207,425 filed Sep. 9, 2008, entitled "METHODS AND APPARATUS FOR DELIVERING DOCUMENTS," currently pending; U.S. application Ser. No. 12/207,449 filed Sep. 9, 2008, entitled "METHOD, SYSTEM, AND APPARATUS FOR SCANNING AND IMPORTING DOCUMENTS," currently pending; U.S. application Ser. No. 12/207,442 filed Sep. 9, 2008, entitled "METHOD AND APPARATUS FOR DISPLAYING A MENU FOR ACCESSING HIERARCHICAL CONTENT DATA INCLUDING CACHING MULTIPLE MENU STATES," currently pending; and U.S. application Ser. No. 12/207,436 filed Sep. 9, 2008, entitled; and "METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE," currently pending, the entire contents of each of which is incorporated by reference herein.

TECHNICAL FIELD

The present application relates in general to user interfaces and more specifically to a method, system, and apparatus for secure data editing on a user interface.

BACKGROUND

Many industries commonly require data including confidential information of customers and other business entities to be entered into a user interface. Confidential information including social security numbers, credit card numbers, medical identification numbers, bank account numbers, and telephone numbers must be entered, viewed, and/or edited on a routine basis in a wide variety of environments ranging from private work areas to public places. Accordingly, many opportunities exist for misappropriation of confidential information displayed on computer screens, cellular phones, automatic teller machines, and the like.

Various methods and devices are available for hiding confidential information from bystanders that may be able to view the confidential information, and particularly, nefarious individuals who are attempting to obtain the confidential information for improper or illegal uses. For users of devices that are intended to protect confidential data, the ability to quickly and efficiently enter, view, and/or edit information while adequately protecting the information is a challenge. As the protection measures for securing information on a device increase, the usability of the device typically decreases. For example, a currently available device may immediately obscure all characters as they are typed into a data field by a user. Accordingly it is quite difficult for a bystander to determine what characters are being typed, however, the user may also find it difficult and inefficient to conduct data entry, viewing, and/or editing.

SUMMARY

The present disclosure provides a new and innovative method, system, and apparatus for secure data editing. Specifically, the disclosed system provides a user interface for receiving a data entry, displaying the data entry for a period of time, and obscuring the data entry for a second period of time based on the triggering of a security event. A security event may be a time out event based on a period of inactivity on the user interface, a change focus event based on a data field change request from the user interface, or a manual lock event based on a manual lock request from the user interface. The user interface may display a data entry with one or more validation characters which provide a reference point within the data entry while the data entry is displayed and while the data entry is obscured. The system may provide multiple user access levels, where a user may have a specified function set based on his user access level. The disclosed system thus provides a user with a highly secure and highly usable system for entering, viewing, and editing data.

Additional features and advantages are described herein, and will be apparent from the following Detailed Description and the figures.

BRIEF DESCRIPTION OF THE FIGURES

FIGS. 4*a*, 4*b*, 4*c*, and 4*d* are illustrations of an example user interface receiving data entries with confidential information and an example secure data editing process obscuring the data entries.

FIGS. 5*a* and 5*b* are illustrations of example user interfaces displaying secure data entries with validation characters.

DETAILED DESCRIPTION

Figure 1:
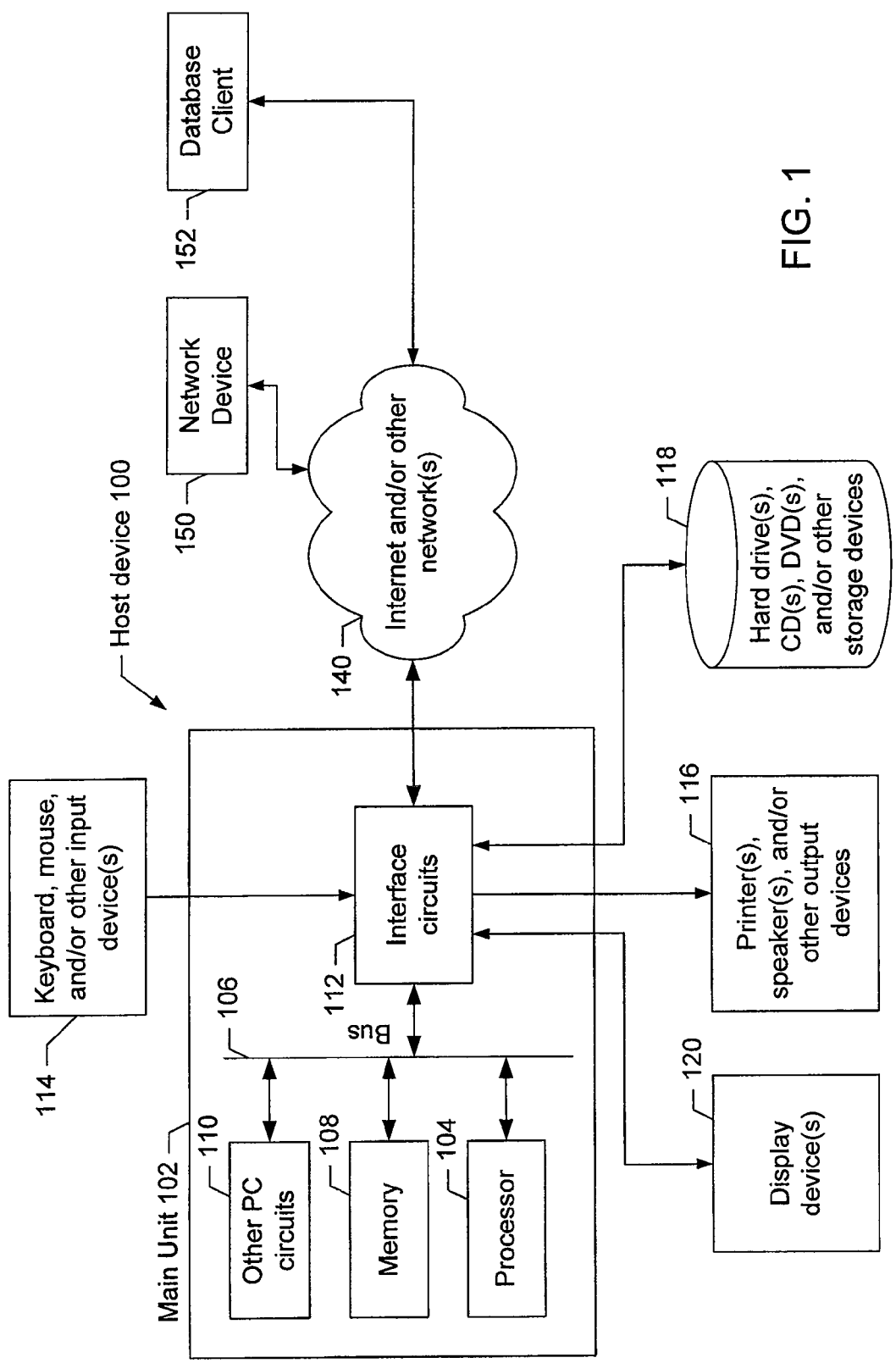
FIG. 1 is a block diagram of the electrical systems of an example architecture for a host device for implementing a secure data editing system.

FIG. 1 is a block diagram of the electrical systems of an example architecture for a host device 100 for implementing the secure data editing system disclosed herein. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from processor 104, storage device 118, network device 150, database client 152, and/or loaded via an input device 114.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a keyboard, mouse, touch screen, track pad, track ball, isopoint, and/or a voice recognition system.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 generates visual displays of data generated during operation of the host device 100, such as the illustrated example user interface screens described below. For example, the display 120 may be used to display a form received from the main unit 102 for receiving customer data such as name, identification number, address, telephone number, and credit card number. The visual displays may include prompts for human input, run time statistics, calculated values, data, etc. In an example described in more detail below, the display 120 may show a plurality of data fields displaying and/or obscuring confidential information.

One or more storage devices 118 may also be connected to the main unit 102 via the interface circuit 112. For example, a hard drive, CD drive, DVD drive, and/or other storage devices may be connected to the main unit 102. The storage devices 118 may store any type of data used by the host device 100. The storage device 118 may store forms for entering data, data entries including confidential information, and/or data indicating the security settings for forms.

The host device 100 may also exchange data with a network device 150 or a remote database client 152 using a connection to network 140. The network connection 140 may be any suitable network connection, such as an Ethernet connection, digital subscriber line (DSL), telephone line, coaxial cable, etc. Access to a host device 100 may be controlled by appropriate security software or security measures. An individual user's access can be defined by the host device 100 and limited to certain data and/or actions. For example, certain users may be allowed to edit certain secure data fields, while other users may not be allowed to edit those fields. Accordingly, users of the system may be required to register with a host device 100. The data exchanged between the host device 100 and the network device 150 or database client 152 may include forms and associated data (i.e., a web page for data entry and inputs from an input device 114), screen files (i.e., image data for display at the database client 152), trapped events at the database client 152, and raw data including data stored on the storage device 118 and manipulable at the network device 150 or database client 152.

Figure 2:
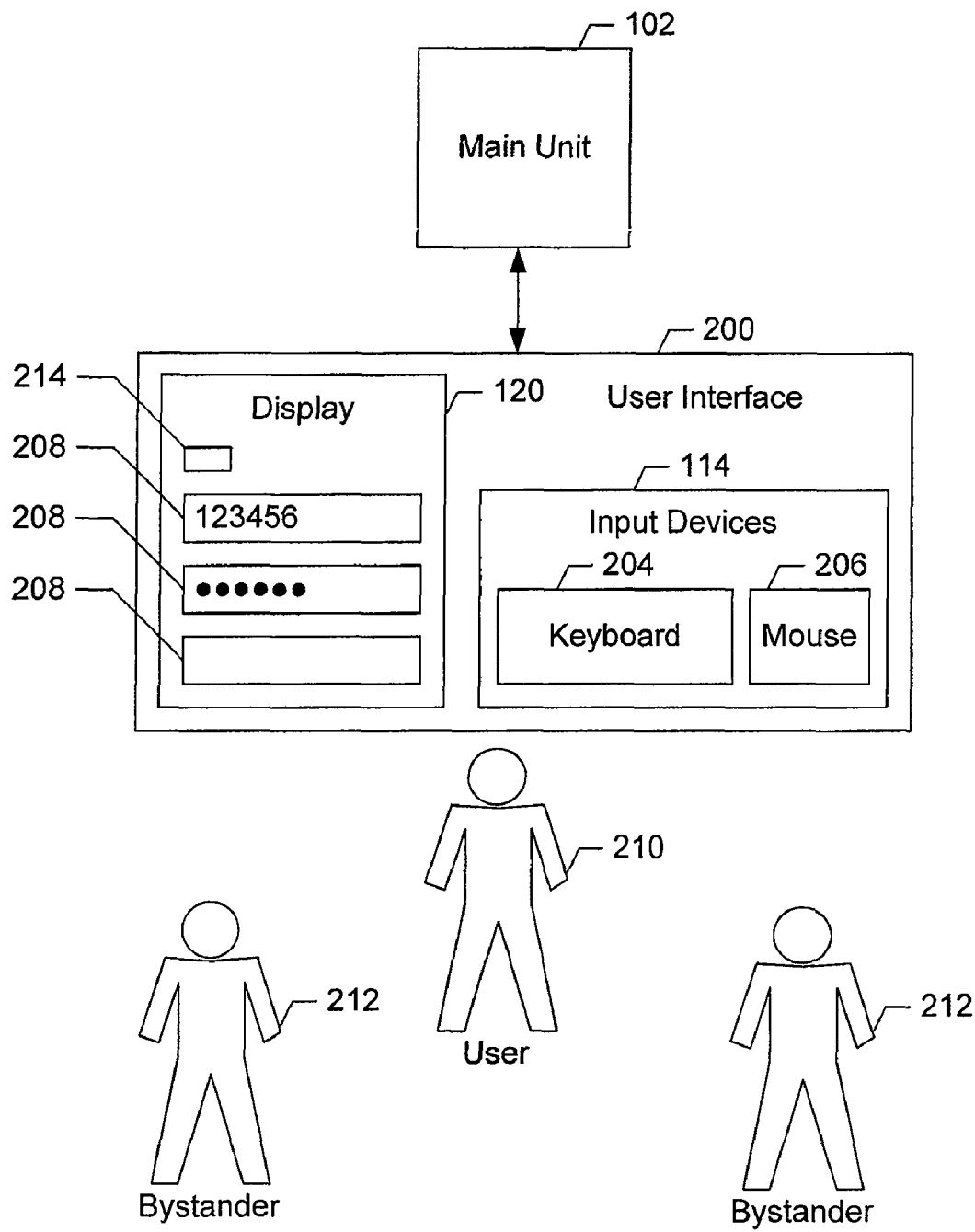
FIG. 2 is a block diagram of an example user interface.

FIG. 2 is a block diagram of an example user interface 200. The example user interface 200 includes a display 120, a keyboard 204, and a mouse 206. The user interface 200 communicates with the main unit 102. Examples of devices including a user interface 200 and main unit 102 include a desktop computer, a laptop computer, a cellular phone, a PDA, an automatic teller machine, a remote medical terminal, etc. A user 210 interacts with the user interface 200 by viewing the display 120 and by entering data via the input devices 114. The user 210 may use the keyboard 204 and the mouse 206 to navigate forms and input data entries into data fields 208. Text characters or other data entries may be displayed in data fields 208. Data entries which may include confidential information may be obscured or blocked from view to protect the confidential information. It will be appreciated that a variety of techniques for obscuring data entries from view are available. For example, each character in the data entry may be replaced with a bullet symbol.

The user interface 200 may be accessed in a wide variety of environments by the user 210. For example, an automatic teller machine is typically located in a public place, where a line may form behind the user 210. Accordingly, bystanders 212 may be able to view the display 120. Information such as the user's personal identification number, account number, and account balance might be viewed by a bystander 212 if appropriate security measures are not taken. Similarly, in a non-public environment such as a private business, there exists a need to protect confidential information. For example, in an insurance company, the user 210 may be an employee using a user interface 200 to record customers' confidential information for record keeping purposes. The user 210 may also have a confidential username and password that must be entered to edit customer information. Other employees or customers may be bystanders 212 that are able to view confidential information, which the bystanders 212 should not have access to.

Figure 3:
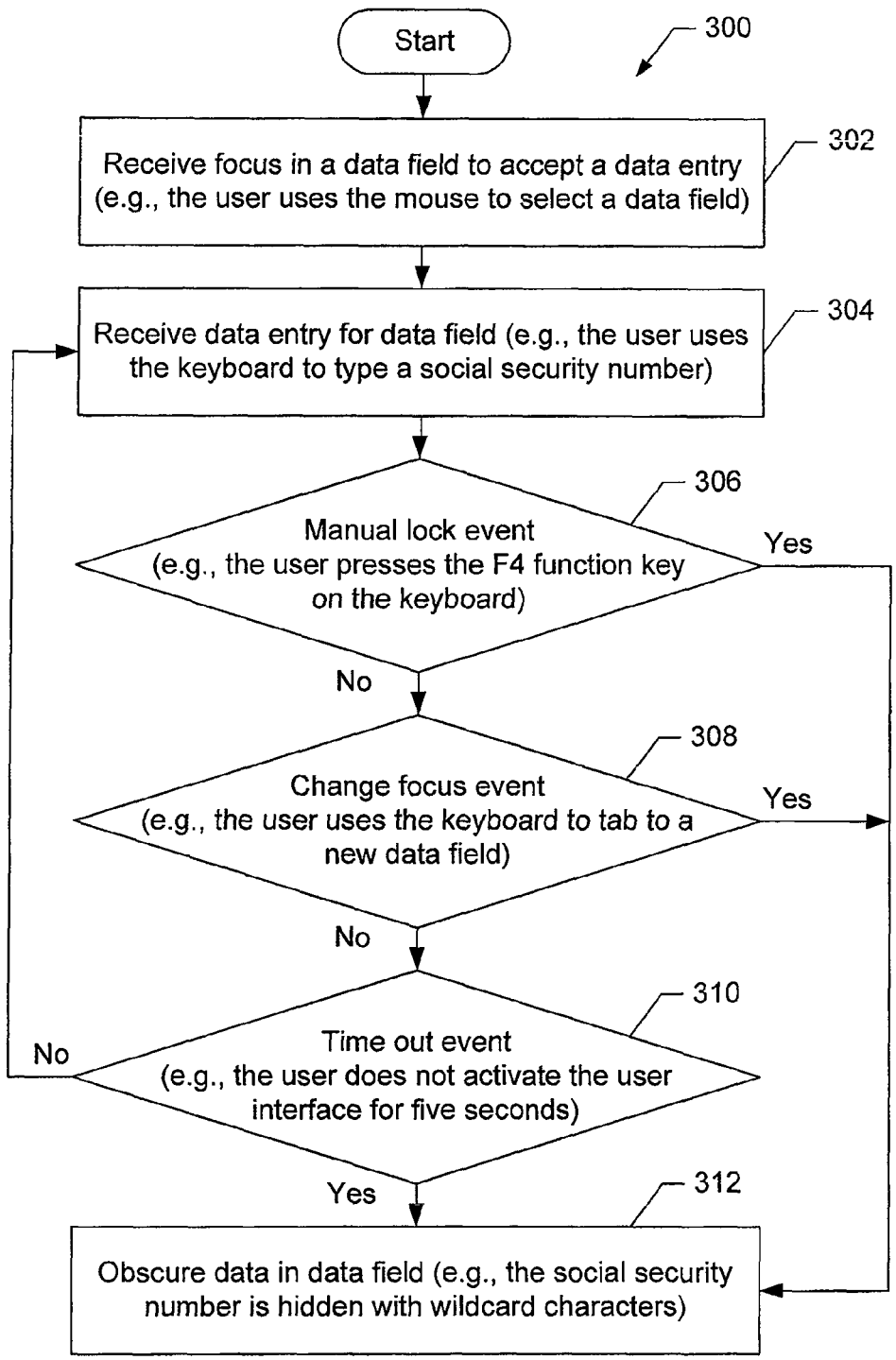
FIG. 3 is a flow chart of an example secure data editing process.

FIG. 3 is a flowchart of an example secure data editing process 300. In general, a data field receives focus to accept a data entry from a user. The user inputs a data entry into the data field via a user interface. A determination is made of whether a manual lock event, a change focus event, or a time out event has triggered based on the user's action or inaction with the user interface. Upon the triggering of a manual lock event, a change focus event, or a time out event, the data entry in the data field is obscured. Although the secure data editing process 300 is described with reference to the flowchart illustrated in FIG. 3, it will be appreciated that many other methods of performing the acts associated with secure data editing process 300 may be used. For example, the order of many of the blocks may be changed, and many of the blocks described are optional. Further, as described in more detail below, the user interface may display a data entry with validation characters and the system may provide specified function sets based on user access level.

The secure data editing process 300 begins when a data field 208 receives focus to accept a data entry (block 302). For example, on a data entry page containing several data fields 208, a social security number text box is selected by a user 210. The user 210 may use a mouse 206 to click on the social security number text box or use the keyboard 204 to tab from data field 208 to data field 208 changing the focus with each tab. The focus may be automatically set to a specific data field 208 when the data entry page opens. Data fields 208 may be a text boxes, drop down lists, combo boxes, list boxes, check boxes, radio buttons, toggle buttons, slider bars, spinners, and/or any other suitable data entry control element. Typically, a data field 208 that has received focus will display an indicator that the data field 208 is ready for data entry, such as a flashing cursor, a highlight around the data field, and/or highlighting a previously existing data entry. Accordingly, the user 210 will typically know that the data field 208 is ready to receive a data entry and may type text, overwrite text, or select a value.

When the data field 208 receives focus, the data field 208 may be empty or contain a previously entered data entry. A previously entered data entry may be displayed or obscured when a data entry page opens. Accordingly, when a data field 208 receives focus, the data field 208 may contain a secure data entry that is obscured. If the data field 208 is obscured, a user 210 may trigger a manual unlock event if the user 210 has access to do so. If the user 210 does not have access, an access message may be displayed and the user 210 may not be able to view or edit the data entry. For example, a manager may bring up a new data entry page, where data field 208 contains an obscured data entry. The manager may press F4 on the keyboard 204 to view the data entry. Because the manager has the appropriate access level, the data entry is displayed and the manager may edit the previously entered data entry in data field 208.

Once a data field 208 has received focus, a data entry is received in the data field 208 (block 304). For example, a user 210 uses a keyboard 204 to enter a social security number into the data field 208. For some data fields, the user 210 may input alphanumeric text and other characters into a data field 208 with the keyboard 204 and/or mouse 206. For some data fields

208, the user 210 may not input text or characters, but may select a value using the mouse 206 or keyboard 204.

As will be discussed in more detail below in relation to blocks 306, 308, 310, and 312 of the example secure data editing process 300, the data entry may be obscured according to the user's 210 action or inaction. As a preface to the description which follows below, in each of blocks 306, 308, and 310, a determination is made of whether a security event has triggered. In each case, if a security event has triggered, the flowchart proceeds to block 312, and the data entry in the data field 208 is obscured. If a security event has not triggered in each of blocks 306, 308, and 310, the flowchart proceeds to block 304, and the data field 208 continues to display the existing data entry and may receive an additional data entry, and then determine again whether a security event has triggered. Preferably, the secure data editing process 300 is intuitive to the user 210, allowing the user 210 to quickly become accustomed to the process by which data entries are obscured. Accordingly, the user 210 may balance efficiently making data entries and maximum data security.

Once a data entry has been received, the system determines if a manual lock event has triggered (block 306). For example, a manual lock event is triggered when a user presses the F4 function key on the keyboard 204. A manual lock event is caused by a manual lock request from the user interface. A manual lock request is a request from the user interface 200 that a data field 208 with a displayed data entry be obscured, while maintaining the focus on the current data field 208. Accordingly, a subsequent manual unlock event may display the data entry as it existed prior to the manual lock event.

A manual lock event may be triggered by any input device 114. For example, a manual lock request may include pressing one or more keys on the keyboard 204, such as F4, Esc, Space, Enter, Ctrl+L, Ctrl+Shift+A, etc. Also, clicking a mouse 206 button may be a manual lock request. For example, a user 210 may left click on a lock button located next to the data field on the display 120. Further, similar to pressing the F4 key, a user 210 may simply right click the mouse 206 regardless of the mouse pointer position on the display 120. Accordingly, the mouse 206 and the keyboard 204 may have overlapping manual lock functionality (e.g., F4 and right click provide the same function from the keyboard 204 and mouse 206). It will be appreciated that a variety of appropriate events from input devices 114, or combinations of events, may request a manual lock event. Further, the user 210 may simultaneously have multiple manual lock request options available, such as the option to press function key F4 and/or left click on a lock button associated with a data field 208.

If a manual lock event has not triggered, the system determines if a change focus event has triggered (block 308). For example, a change focus event is triggered when a user presses the Tab key on the keyboard 204 to change the focus to the next data field 208. A change focus event is caused by a change focus request from the user interface. A change focus request is a request from the user interface 200 that a data field 208 with a displayed data entry be obscured, while changing the focus to a new data field 208.

A change focus event may be triggered by any input device 114. For example, a change focus request may include pressing one or more keys on the keyboard 204, such as Tab, Shift+Tab, Space, Enter, Page Down, Ctrl+Tab, Ctrl+Shift+Q, etc. Also, clicking a mouse 206 button may be a change focus request. For example, a user 210 may left click on a new data field 208 or a "next" button 214 on the display 120, or a user 210 may simply right click the mouse 206 regardless of the mouse pointer position on the display 120. It will be appreciated that a variety of appropriate events from input devices 114, or combinations of events, may request a change focus event. Further, the user 210 may simultaneously have multiple change focus request options available, such as the option to press the Tab key and/or left click on a new data field 208. Further, the change focus event may change the focus within the current page or change focus to a new page. For example, the user 210 may press Ctrl+Tab to change the focus to the next screen or page, thus skipping one or more data fields 208 on the current screen or page.

If a change focus event has not triggered, the system determines if a time out event has triggered (block 310). For example, a time out event is triggered when a user does not activate the user interface 200 for five seconds. A time out event triggers in response to the user 210 not activating one or more input devices 114 for a threshold period of time. Main unit 102 may have a timer which resets each time an input device 114 is activated by the user 210. Whenever the user 210 activates an input device 114, the timer resets. Accordingly, if a user 210 continually inputs data entries into a data field 208, a time out event will never trigger unless the user 210 ceases activating the user interface 200 to input data entries. A time out event may maintain the focus in the current data field 208, remove the focus from the current data field 208, or change the focus to a new data field 208 or other control element.

A time out event may be triggered by inactivity on any input device 114. For example, not pressing any keys on the keyboard 204. Alternatively, not pressing specific keys on the keyboard 204 may cause a time out event. For example, if an application only accepts numerical text, when a user 210 presses a letter key on the keyboard 204, the timer at the main unit 102 may not be reset. Also, moving a mouse 206 pointer may or may not reset the timer at the main unit 102. For example, a user 210 may not be moving the mouse 206 or typing on the keyboard 204, so a time out event may trigger because the keyboard 204 and the mouse 206 have both been inactive for a threshold period of time. Alternatively, a user 210 may be moving the mouse 206, but not typing on the keyboard 204, and a time out event may trigger because the keyboard 204 has not been activated for a threshold period of time, even though the mouse 206 was being activated by the user 210. Alternatively, a user may be typing letters but not numbers on the keyboard 204, and not moving the mouse 206, so a time out event may trigger because the numeric keys of the keyboard 204 and the mouse 206 have both been inactive for a threshold period of time. It will be appreciated that a variety of events from input devices 114, or combinations of events, may or may not reset the timer at main unit 102, thus, determining whether a time out event will trigger.

If a time out event has not triggered, the existing data entry in the data field 208 continues to be displayed and an additional data entry may be received in the data field 208 (block 304). For example, the user 210 continues using the keyboard 204 to enter a social security number into the data field 208. The process outlined above regarding blocks 306, 308, and 310 may be a highly iterative process, as the main unit 102 may determine whether a manual lock event, change focus event, and/or time out event has triggered many times per second, and a time out event may not trigger for several seconds of inactivity on the user interface 200.

If a manual lock event has triggered, the system obscures the data entry in the data field 208 (block 312). For example, the social security number is hidden with wildcard characters. The user 210 may type the beginning of a social security number "123" into a data field 208. The user 210 may then press F4 key on the keyboard 204 to obscure the "123" with "●●●" in the data field 208. The user 210 may press F4 when a bystander 212 approaches and can view the display 120. The focus may be maintained in the data field 208, so that at a later time, the user 210 can continue typing in the rest of the social security number without having to manually reset the focus.

If a change focus event has triggered, the system obscures the data entry in the data field 208 (block 312). However, the focus is not maintained in the current data field 208. Rather, a new data field 208 or other control element receives the focus when a change focus event triggers. For example, the user 210 may press the Tab key on the keyboard upon an entry's completion to obscure the data entry from view while simultaneously bringing the focus to a new data field 208 for a different data entry.

Similarly, if a time out event has triggered, the system obscures the data entry in the data field 208 (block 312). For example, while entering a social security number into a data field 208, the user 210 becomes distracted for five seconds and the portion of the social security number already entered is hidden. Accordingly, any confidential data will not be left unattended by the user 210 for an unacceptable period of time. The threshold period of time for triggering the time out event may be set according to the data field 208 and/or particular application at hand. The threshold period of time for a time out event may vary from data field 208 to data field 208. For example, a data field 208 for a credit card number may require a higher threshold time than a data field 208 for the credit card expiration date. Further, the threshold period of time may vary based on the user 210. For example, a setting may be available to increase the threshold period of time for a user 210 whose vision is impaired or based on the security of the user's 210 location and/or the typical presence or absence of bystanders in the user's 210 work area. A visually impaired user 210 may be required to input an identifier such as a password to gain access to a non-standard functionality such as an increased threshold period of time.

The user 210 may also be provided with a tool to hold off a time out event for a period of time. For example, if a data entry is unusually long, and the user 210 needs to ensure that the data entry is correct, the user 210 may need more than five seconds to review the data entry. A hold off tool may be used to prevent the time out event from triggering. For example, the user 210 may press a special combination of keys, for example, Ctrl+Shift+Space, to allow enough time to reread the entire data entry before moving on to the next data field 208. This feature may or may not have a maximum time limit.

FIGS. 4a, 4b, 4c, and 4d are example illustrations of a user interface 400 receiving data entries with confidential information and an example secure data editing process 300 obscuring the data entries. As illustrated in FIG. 4a, once the Name data field receives the focus, the user 210 may type a name, e.g., Johnny Q. Public. The user 210 then presses the Tab key on the keyboard 204, triggering a change focus event to obscure the name and move the focus to the Address data field. Then, as illustrated in FIG. 4b, the user 210 types the address, e.g., 123 Main Street. The user 210 then uses the mouse 206 to left click on the lock button 402 associated with the Address data field, triggering a manual lock event. An unlock button 404 replaces the lock button 402 for the Address data field, because the data entry has been obscured by the manual lock event. The user 210 then left clicks on the Client data field, bringing the focus to the drop down list which displays a variety of clients for the user 210 to select. Then, as illustrated in FIG. 4c, the user 210 uses the mouse 206 to select a client, e.g., XYZ Inc. The user 210 then does not use the keyboard 204 or the mouse 206 for a threshold period of three seconds triggering a time out event. Accordingly, the selected client is obscured and the list options are no longer displayed. Then, as illustrated in FIG. 4d, the user 210 uses the mouse 206 to left click the unlock button 404 associated with the Address data field to ensure that the proper address has been entered. Accordingly, the unlock button 404 changes to a lock button 402, which could be used to trigger another manual lock event.

FIGS. 5a and 5b are illustrations of example user interfaces 500 and 550 displaying secure data entries with validation characters. In FIG. 5a, example user interface 500 shows several data fields, including Name data field 502, Telephone data field 504, and Identification Number data field 506 each with data entries obscured, the Credit Card Number data field 508 with the data entry displayed, and the Social Security Number data field 510, Repeat Customer data field 512, and Comments data field 514, each without data entries from a user 210. Data field 502 includes wildcard characters to obscure the customer name entered by the user 210. In this example, one wildcard character is used for each text character entered by the user 210. Data field 504 includes the customer's telephone number, which is obscured, but includes parentheses and a hyphen within the obscured data. The parentheses and hyphen are validation characters that are not obscured upon the securing of the data. Validation characters may be typed in by the user 210 with the data entry, thereby making it easier for a user 210 to ensure that the proper number of characters have been entered, even after the data entry is obscured. Data field 506 shows another example of a data entry that includes a "/" validation character displayed. The displayed slash may provide information about the identification number, particularly if various types of identification numbers are used. The data entries in data fields 502, 504, and 506 have each been obscured upon the triggering of a security event. Data field 508 displays a credit card number entered by the user 210 before any manual lock event, change focus event, or time out event has triggered. Data field 510 does not have any data entry from the user 210, but displays two hyphens. Preferably, validation characters may be entered by the user 210 or may be automatically present in a data field 510 without user intervention. Data fields 512 and 514 have not received any data entry from the user 210.

As illustrated in FIG. 5b, example user interface 550 shows several data fields, including Name data field 552, Telephone data field 554, and Identification Number data field 556, the Credit Card Number data field 558 the Social Security Number data field 560, Repeat Customer data field 562, and Comments data field 564, each with data entries obscured. Data field 552, like data field 502, includes wildcard characters to obscure a customer name. However, the example user interface 550 differentiates alphabetic characters from numeric characters, obscuring each letter with an "x" and each number with a "●" to provide additional information to the user 210. Data field 554 includes the same display as above described data field 504 because a telephone number includes only numeric characters and validation characters. The validation characters make it easy for the user 210 to see that an entire telephone number has been entered, whereas without the validation characters, the obscured text would be displayed as ●●●●●●●●●●, which appears very similar to a telephone number missing one digit, which would be displayed as ●●●●●●●●●. The parentheses and hyphen provide context to the telephone number with recognizable reference points. Similar to data field 506, data field 556 includes an obscured identification number. However, a user 210 viewing data field 556 is provided with the information that the identification number includes two letters, a slash, four numbers, and one letter. The obscured data entry in field 556 may be AB/12345K. This may be useful for determining that an appropriate combination of letters and numbers has been entered into the data field 556. Also, the combination of numbers, letters, and validation characters may provide information not specific to the actual characters. For example, a particular character format for a client identification number such as xx/●●●●x, may indicate that the client is a long time client and a foreign company. Certain character formats may be recognized as a standard format or as an outside party format. Securing the data does not require that the data entry provide no information to a viewer. Secure data editing may be tailored to a particular application to provide the appropriate level of security.

Data field 558 displays the last four digits of a credit card number, while obscuring the first twelve digits of the number, and includes validation characters within the data entry. A particular application may not require a complete obscuring of a data entry for various reasons. For example, the security benefits of obscuring the data may not outweigh the convenience of displaying the data. Accordingly, certain portions of a data entry may not be obscured upon the triggering of a security event. Field 560 includes an obscured social security number with validation characters that were preset in the data field 560 rather than entered by the user 210. Data field 562 may be a checkbox, radio button, or other similar binary control element. The user 210 has entered or selected a value for data field 562, which has been obscured. Data field 564 includes obscured comments that end with a six digit number.

Each data field shown in FIG. 5b has an obscured data entry, but data field 558 still displays a portion of the data entry. The user 210 may be provided with a manual lock event to obscure all data. For example, the manual lock event may be triggered by the F4 function key and a master manual lock event may be triggered by pressing Ctrl+F4 to obscure any displayed data, even including data that may not be confidential.

Certain functions may be approved based on a user's 210 status. For example, a manager may have access to a master manual lock button and a master manual unlock button. Preferably, a user 210 with a higher status level would provide a password or other identifier to gain access to functions such as the master unlock button. Also, a user 210 may have different function access based on the device in use. For example, a manager may have unrestricted function access using an office desktop computer but a restricted function access on a mobile device. Also, a function such as change focus event may have multiple levels functionality based on user 210 access level. For example, a manager may be able to change focus to the next page by pressing Ctrl+Tab, skipping various data fields 208, while a non-manager may not have access to the Ctrl+Tab change focus event. Further, a non-manager may not be able to unlock a particular data field that has been locked by a security event or may only have limited access to the data entry, such as being able to view but not edit the data entry. However, a manager may have access to an unlock button for that particular data field which not only displays the data entry, but also allows the data entry to be deleted, overwritten, or otherwise modified. Similarly, access to a copy function or a cut function for obscured data entries may be determined by a user's 210 access level. Additionally, a blind editing function, which allows the user 210 to delete, overwrite, or modify data which is obscured from view as it is being edited may be available to certain users 210. When using the blind overwrite function, no security event occurs because the data entry is already obscured. Blind editing may only be available with certain data fields 208 and/or based on user 210 access level. If a user 210 attempts to use a function that the user 210 does not have access to, an access message may be displayed. For example, an access message popup may indicate the user 210 does not have the required level of access and instruct the user to contact a manager.

The above described example data fields, data entries, and user access is not meant to limit the scope of information that may be protected with the secure data editing process 300. Further, the above described set of validation characters is only an example and is not meant to limit the scope of validation characters.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for secure data editing, comprising:
receiving a data entry including a plurality of characters in a first data field, the data entry being specified by a user interface;
displaying the entire data entry for a first period of time;
determining whether a period of inactivity on the user interface exceeds a threshold;
determining whether the user interface has received a change focus request;
determining whether the user interface has received a manual lock request;
triggering a security event in response to at least one of the period of inactivity on the user interface exceeds the threshold, the user interface has received a change focus request, and the user interface has received a manual lock request;
obscuring the data entry for a second period of time following the first period of time, the data entry being obscured upon the triggering of the security event; and
displaying a validation character within the data entry during the second period of time.

2. The method of claim 1, wherein the validation character is at least one of a hyphen and a slash.

3. The method of claim 1, wherein the threshold period of inactivity on the user interface is at least five seconds.

4. The method of claim 1, wherein the change focus event is triggered when the user interface receives a change focus request from activation of a tab key.

5. The method of claim 1, wherein the change focus event is triggered when the user interface receives a change focus request from activation of a mouse click on a second data field.

6. The method of claim 1, wherein the manual lock event is triggered when the user interface receives a manual lock request from activation of a function key.

7. The method of claim 1, wherein the manual lock event is triggered when the user interface receives a manual lock request from activation of a mouse click on a lock button.

8. The method of claim 1, further comprising displaying a lock button during the first time period, wherein activating the lock button via the user interface triggers the manual lock event.

9. The method of claim 1, further comprising displaying an unlock button during the second time period, wherein activating the unlock button via the user interface triggers a manual unlock event.

10. The method of claim 1, wherein the first data field reveals information regarding the data entry during the second time period.

11. The method of claim 1, wherein the period of inactivity on the user interface exceeds the threshold and the first data field maintains a focus.

12. A method for secure data editing, comprising:
receiving a user identifier, the user identifier being specified by a user interface;
determining a user access level associated with the user identifier, wherein at least two user access levels exist and each user access level provides a different set of user functions;
receiving a data entry in a first data field, the data entry being specified by the user interface;
displaying the data entry including a plurality of characters for a first period of time;
determining whether a period of inactivity on the user interface exceeds a threshold;
determining whether the user interface has received a change focus request;
determining whether the user interface has received a manual lock request;
triggering a security event in response to at least one of the period of inactivity on the user interface exceeds the threshold, the user interface has received a change focus request, and the user interface has received a manual lock request; and
obscuring the data entry for a second period of time following the first period of time, the data entry being obscured upon the triggering of the security event.

13. The method of claim 12, wherein the user identifier includes at least a user name and a password.

14. The method of claim 12, wherein the user access level provides a function set including at least a delete capability and an overwrite capability.

15. The method of claim 12, wherein the user access level provides a function set including a manual unlock event.

16. The method of claim 12, wherein the user access level specifies a first function set for the first data field and a second function set for a second data field.

17. The method of claim 12, wherein the threshold period of inactivity on the user interface is at least five seconds.

18. The method of claim 12, wherein the change focus event is triggered when the user interface receives a change focus request from activation of a tab key.

19. The method of claim 12, wherein the change focus event is triggered when the user interface receives a change focus request from activation of a mouse click on a second data field.

20. The method of claim 12, wherein the manual lock event is triggered when the user interface receives a manual lock request from activation of a function key.

21. The method of claim 12, wherein the manual lock event is triggered when the user interface receives a manual lock request from activation of a mouse click on a lock button.

22. The method of claim 12, further comprising displaying a lock button during the first time period, wherein activating the lock button via the user interface triggers the manual lock event.

23. The method of claim 12, further comprising displaying an unlock button during the second time period, wherein activating the unlock button via the user interface triggers a manual unlock event.

24. The method of claim 12, wherein the first data field reveals information regarding the data entry during the second time period.

25. The method of claim 12, wherein the period of inactivity on the user interface exceeds the threshold and the first data field maintains a focus.

26. The method of claim 12, further comprising displaying a validation character within the data entry during the second period of time.

27. The method of claim 26, wherein the user identifier includes at least a user name and a password.

28. The method of claim 26, wherein the user access level provides a function set including at least a delete capability and an overwrite capability.

29. The method of claim 26, wherein the user access level provides a function set including a manual unlock event.

30. The method of claim 26, wherein the user access level specifies a first function set for the first data field and a second function set for a second data field.

31. The method of claim 26, wherein the threshold period of inactivity on the user interface is at least five seconds.

32. The method of claim 26, wherein the change focus event is triggered when the user interface receives a change focus request from activation of a tab key.

33. The method of claim 26, wherein the change focus event is triggered when the user interface receives a change focus request from activation of a mouse click on a second data field.

34. The method of claim 26, wherein the manual lock event is triggered when the user interface receives a manual lock request from activation of a function key.

35. The method of claim 26, wherein the manual lock event is triggered when the user interface receives a manual lock request from activation of a mouse click on a lock button.

36. The method of claim 26, further comprising displaying a lock button during the first time period, wherein activating the lock button via the user interface triggers the manual lock event.

37. The method of claim 26, further comprising displaying an unlock button during the second time period, wherein activating the unlock button via the user interface triggers a manual unlock event.

38. The method of claim 26, wherein the first data field reveals information regarding the data entry during the second time period.

39. The method of claim 26, wherein the period of inactivity on the user interface exceeds the threshold and the first data field maintains a focus.

40. An apparatus for secure data editing, comprising:
a processor;
a user interface operatively coupled with the processor; and
a storage device, the storage device storing a software program structured to cause the processor to:
receive a data entry in a first data field, the data entry being specified by the user interface;
display the data entry including a plurality of characters for a first period of time;
determine whether a period of inactivity on the user interface exceeds a threshold;
determine whether the user interface has received a change focus request;
determine whether the user interface has received a manual lock request;
trigger a security event in response to at least one of the period of inactivity on the user interface exceeds the threshold, the user interface has received a change focus request, and the user interface has received a manual lock request;

obscure the data entry for a second period of time following the first period of time, the data entry being obscured upon the triggering of the security event; and display a validation character within the data entry during the second period of time.

41. An apparatus for secure data editing, comprising:
a processor;
a user interface operatively coupled with the processor; and
a storage device, the storage device storing a software program structured to cause the processor to:
receive a user identifier, the user identifier being specified by a user interface;
determine a user access level associated with the user identifier, wherein at least two user access levels exist and each user access level provides a different set of user functions;
receive a data entry in a first data field, the data entry being specified by the user interface;
display the data entry including a plurality of characters for a first period of time;
determine whether a period of inactivity on the user interface exceeds a threshold;
determine whether the user interface has received a change focus request;
determine whether the user interface has received a manual lock request;
trigger a security event in response to at least one of the period of inactivity on the user interface exceeds the threshold, the user interface has received a change focus request, and the user interface has received a manual lock request; and
obscure the data entry for a second period of time following the first period of time, the data entry being obscured upon the triggering of the security event.

42. The apparatus of claim 41, wherein the software program is further structured to cause the processor to display a validation character within the data entry during the second period of time.

43. A non-transitory machine readable medium storing instructions structured to cause an apparatus to:
receive a data entry in a first data field, the data entry being specified by the user interface;
display the data entry including a plurality of characters for a first period of time;
determine whether a period of inactivity on the user interface exceeds a threshold;
determine whether the user interface has received a change focus request;
determine whether the user interface has received a manual lock request;
trigger a security event in response to at least one of the period of inactivity on the user interface exceeds the threshold, the user interface has received a change focus request, and the user interface has received a manual lock request;
obscure the data entry for a second period of time following the first period of time, the data entry being obscured upon the triggering of the security event; and
display a validation character within the data entry during the second period of time.

44. A non-transitory machine readable medium storing instructions structured to cause an apparatus to:
receive a user identifier, the user identifier being specified by a user interface;
determine a user access level associated with the user identifier, wherein at least two user access levels exist and each user access level provides a different set of user functions;
receive a data entry in a first data field, the data entry being specified by the user interface;
display the data entry including a plurality of characters for a first period of time;
determine whether a period of inactivity on the user interface exceeds a threshold;
determine whether the user interface has received a change focus request;
determine whether the user interface has received a manual lock request;
trigger a security event in response to at least one of the period of inactivity on the user interface exceeds the threshold, the user interface has received a change focus request, and the user interface has received a manual lock request; and
obscure the data entry for a second period of time following the first period of time, the data entry being obscured upon the triggering of the security event.

45. The non-transitory machine readable medium of claim 44, wherein the instructions are further structured to cause an apparatus to display a validation character within the data entry during the second period of time.

* * * * *